Nov. 7, 1967  C. L. DILLON ET AL  3,350,836
CARTON DIVIDER INSERTING APPARATUS
Filed Oct. 20, 1964  7 Sheets-Sheet 1
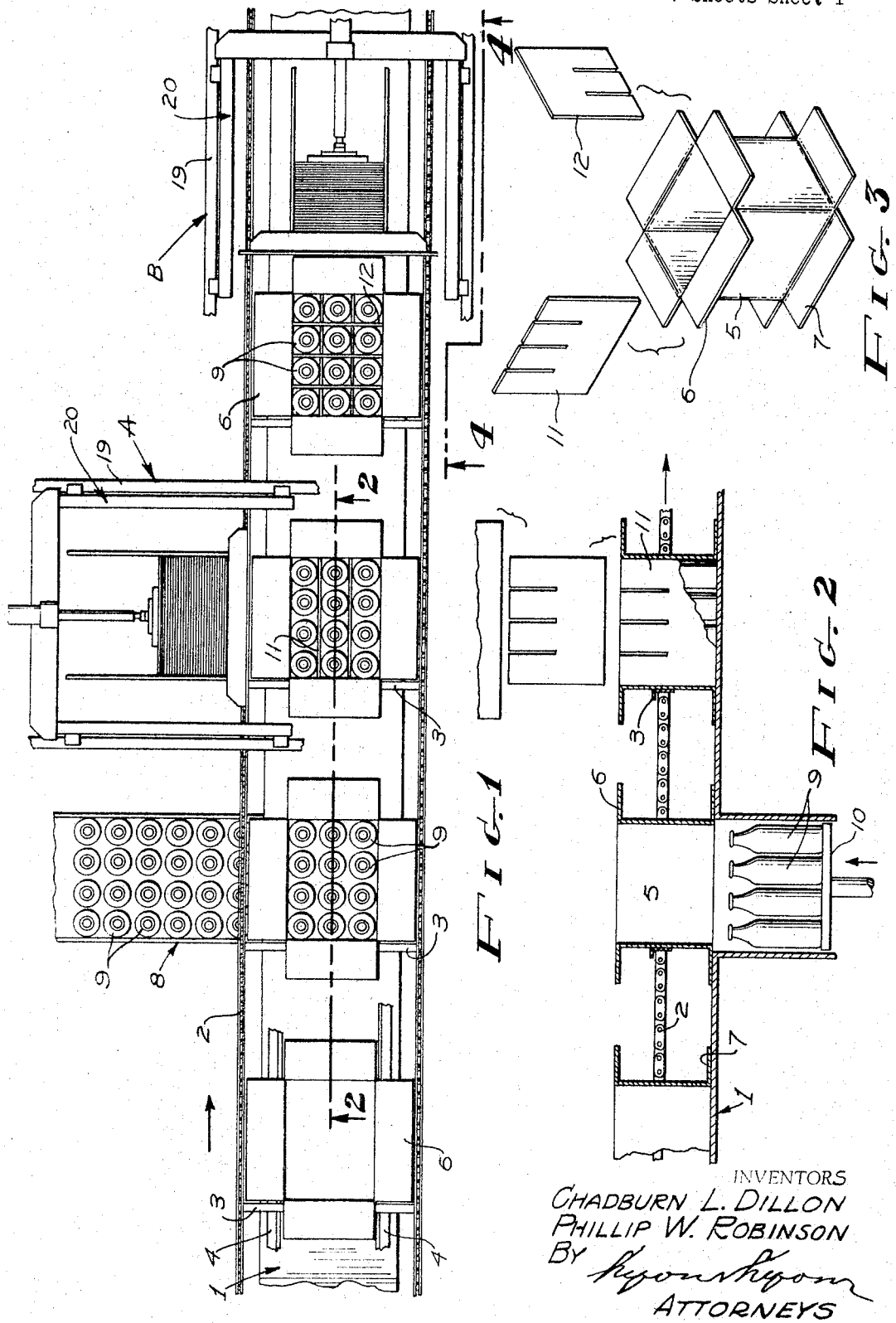
INVENTORS
CHADBURN L. DILLON
PHILLIP W. ROBINSON
BY
ATTORNEYS

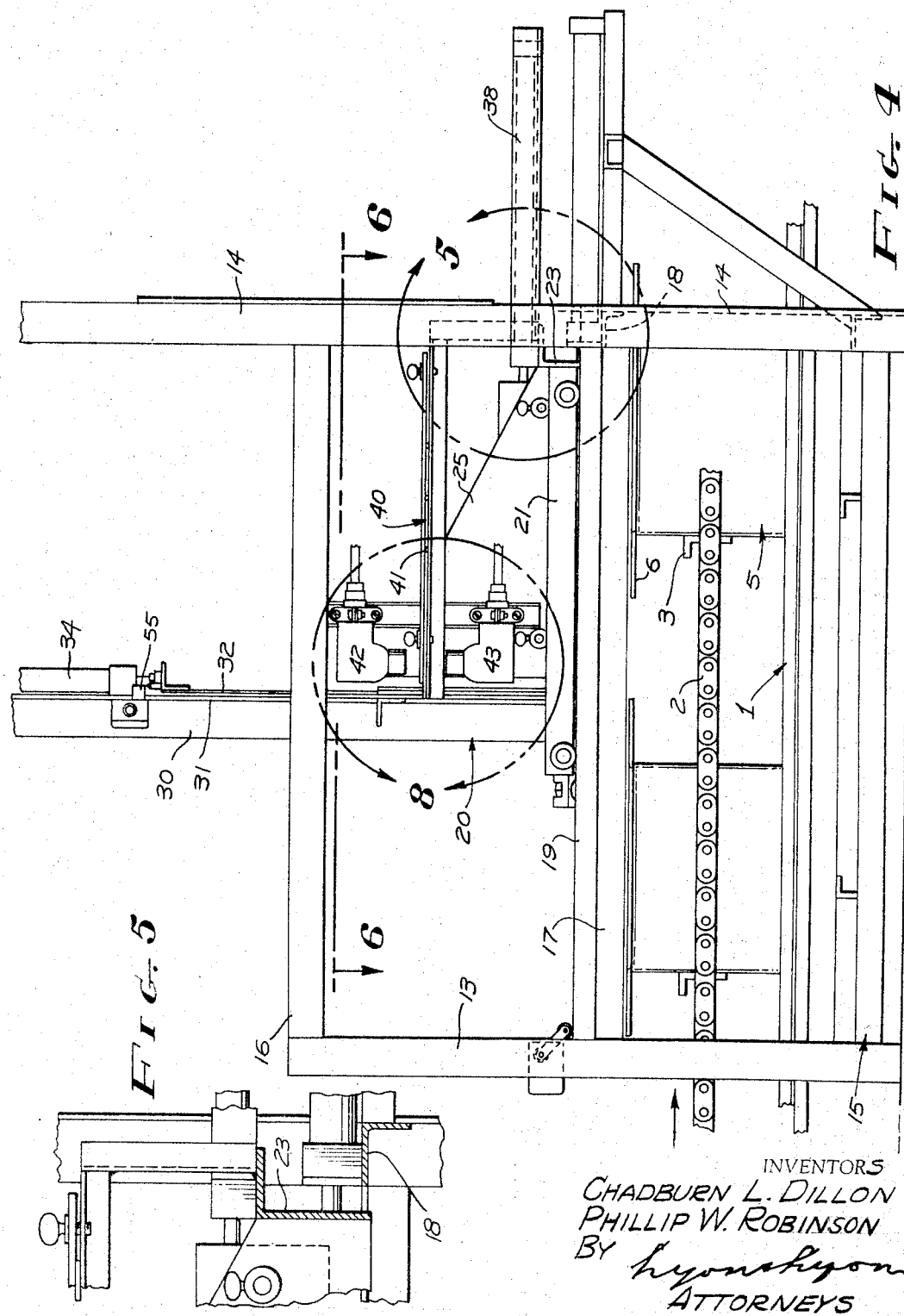

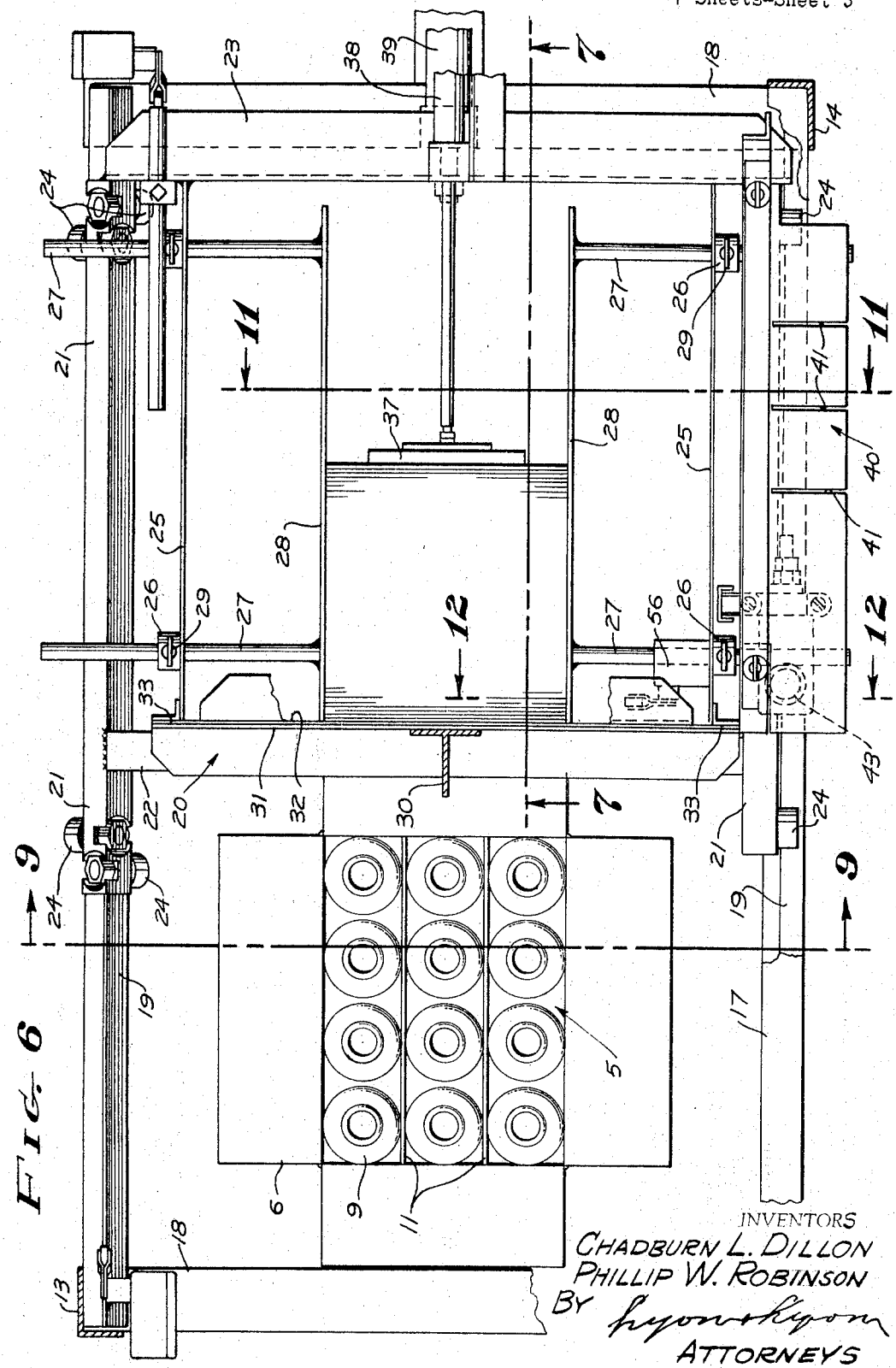

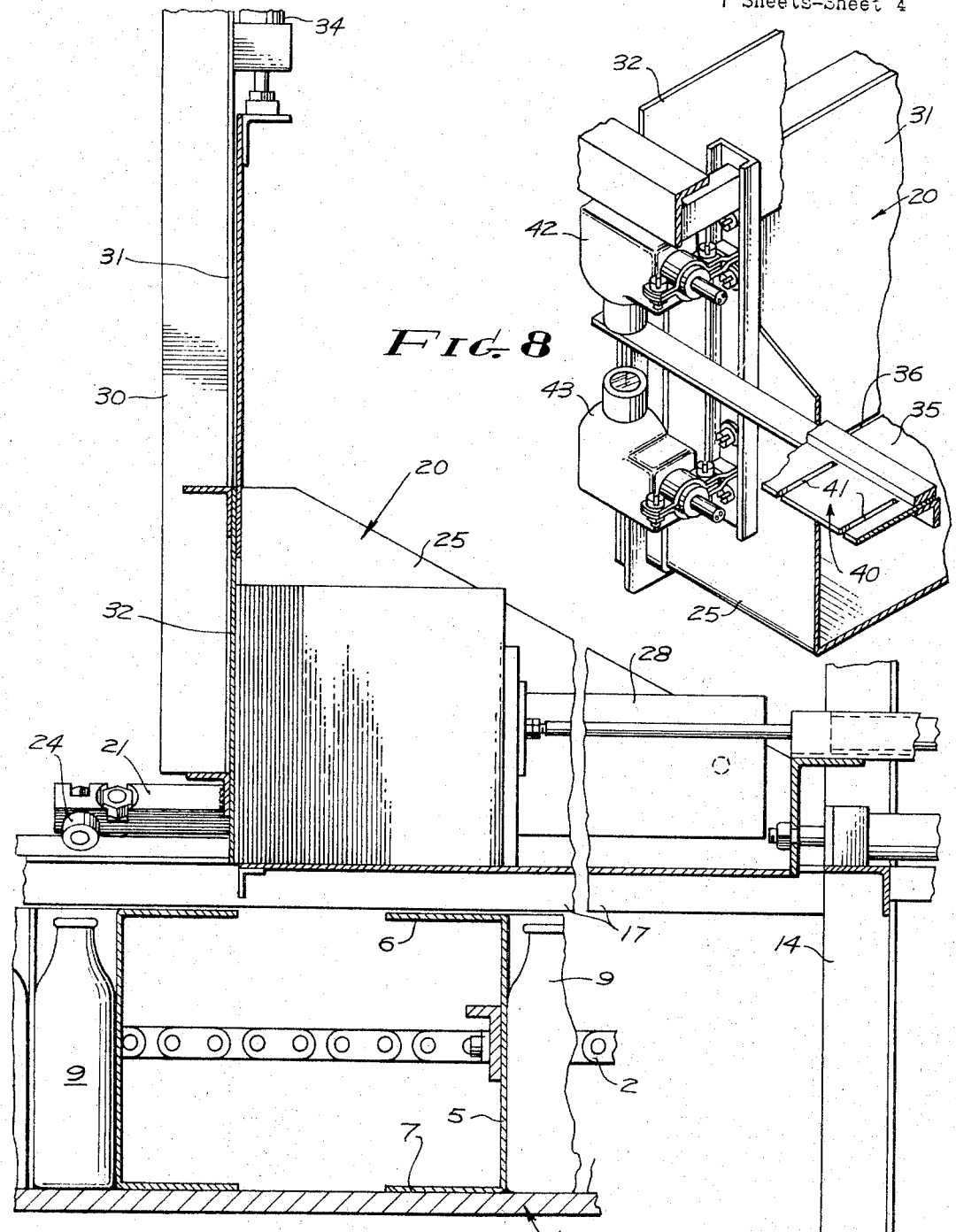

Nov. 7, 1967 C. L. DILLON ET AL 3,350,836
CARTON DIVIDER INSERTING APPARATUS
Filed Oct. 20, 1964 7 Sheets-Sheet 5

INVENTORS
CHADBURN L DILLON
PHILLIP W. ROBINSON
BY
ATTORNEYS

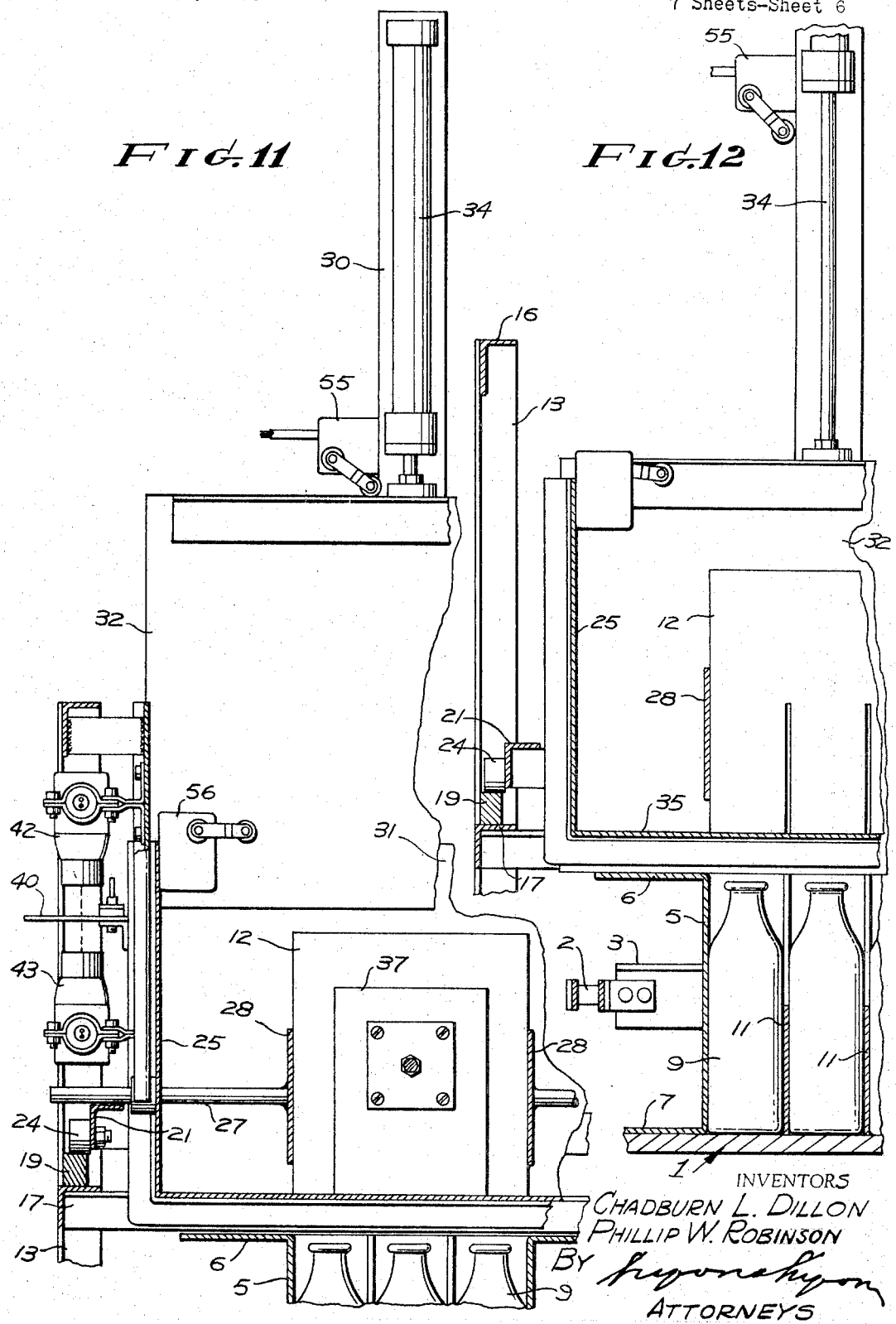

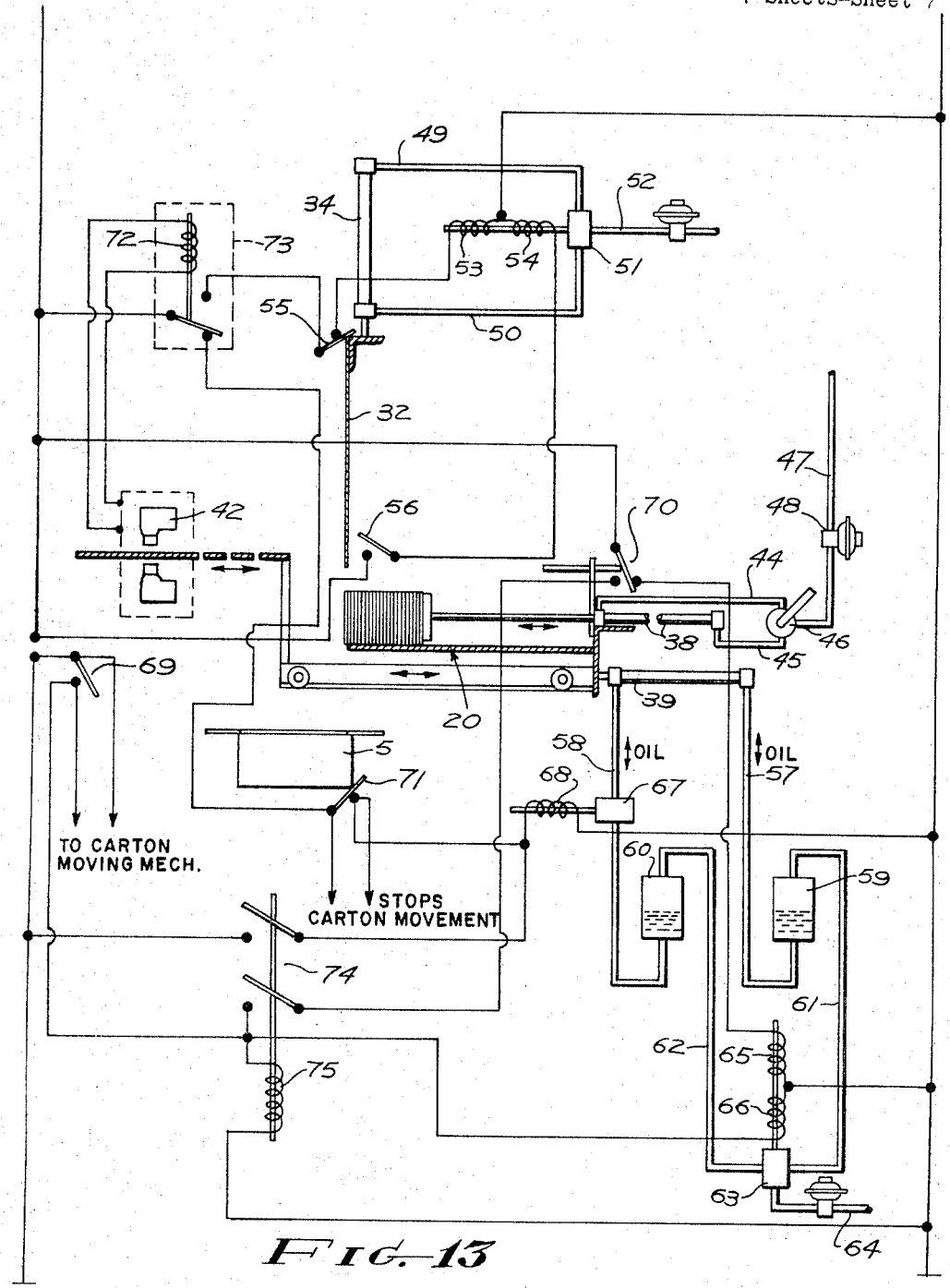

United States Patent Office 3,350,836
Patented Nov. 7, 1967

3,350,836
CARTON DIVIDER INSERTING APPARATUS
Chadburn L. Dillon and Phillip W. Robinson, both of
P.O. Box 71707, Downey, Calif. 90241
Filed Oct. 20, 1964, Ser. No. 405,112
8 Claims. (Cl. 53—67)

ABSTRACT OF THE DISCLOSURE

An apparatus which utilizes an intermittently movable conveyor to carry open cartons into which is placed a set of containers, and simultaneously, dividers are inserted between the containers of previously filled cartons by feeding mechanisms which advance over the cartons.

This invention relates to carton divider inserting apparatus and included in the objects of this invention are:

First, to provide a carton divider inserting apparatus which automatically inserts two sets of dividers into a carton which has been previously filled with bottles or other containers; that is, the dividers are automatically thrust between the bottles or containers previously placed in the carton.

Second, to provide an apparatus of this class which is arranged to accept bottle filled cartons wherein all flaps of the carton are spread outwardly so that the top and bottom of the carton are open and the bottles are supported directly upon an underlying conveyor; thereby permitting later closing of the carton with the bottles in neck up or neck down position as desired by the customer.

Third, to provide a carton divider inserting apparatus which may be readily adjusted to accept cartons of various sizes and containing various numbers of bottles or other containers.

With the above and other objects in view, as may appear hereinafter, reference is directed to the accompanying drawings, in which:

FIGURE 1 is a diagrammatical plan view of the bottle divider inserting apparatus.

FIGURE 2 is a diagrammatical longitudinal sectional view thereof taken through 2—2 of FIGURE 1.

FIGURE 3 is a perspective view of a carton opened for passage through the apparatus and also showing the dividers.

FIGURE 4 is an enlarged fragmentary side view of the final divider inserting mechanism taken from 4—4 of FIGURE 1.

FIGURE 5 is a further enlarged partial sectional view taken within circle 5 of FIGURE 4.

FIGURE 6 is a fragmentary partial sectional, partial plan view taken from 6—6 of FIGURE 4.

FIGURE 7 is a fragmentary sectional view taken through 7—7 of FIGURE 6.

FIGURE 8 is a fragmentary perspective view of the position sensing means taken within circle 8 of FIGURE 4.

FIGURE 11 is a fragmentary transverse sectional view taken through 11—11 of FIGURE 6 with the dividers omitted and the divider delivery blade in its raised position.

FIGURE 12 is a fragmentary sectional view taken substantially through 12 of FIGURE 6 showing the divider delivery blade in its lower position.

FIGURE 13 is a diagram showing the principal electrical and fluid operated devices of the divider inserting mechanism.

Figure 9:
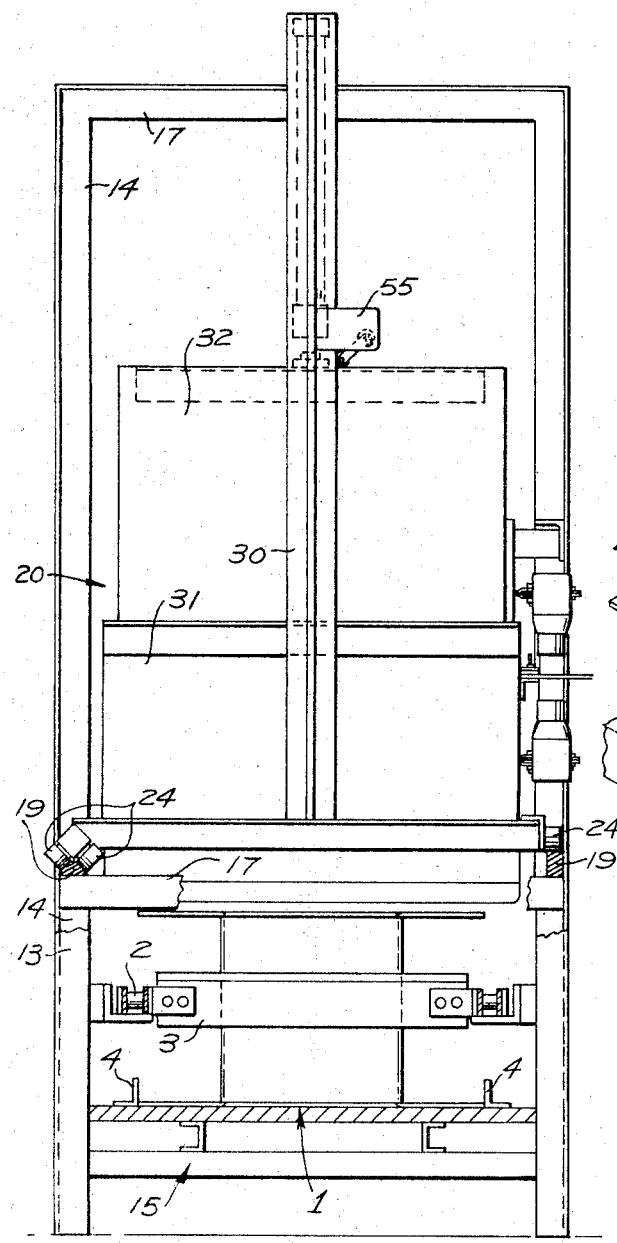
FIGURE 9 is a reduced fragmentary transverse sectional view taken from 9—9 of FIGURE 6.
Figure 10:
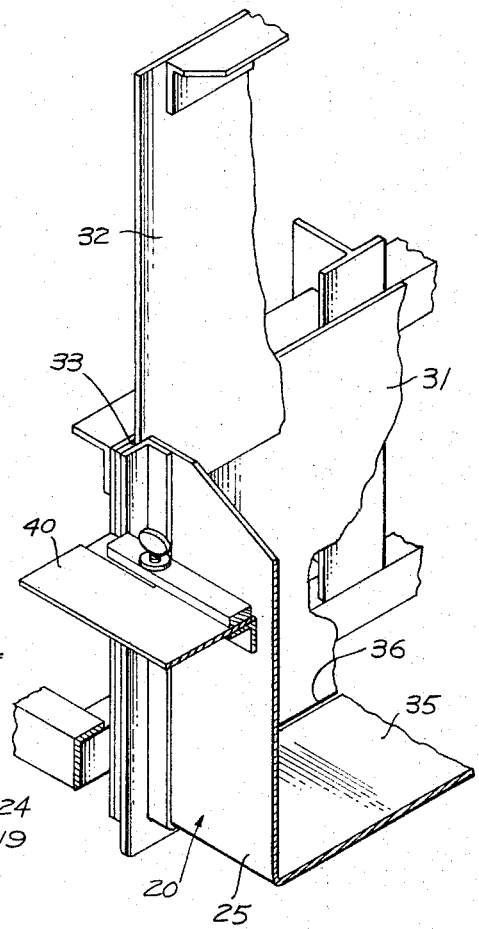
FIGURE 10 is a fragmentary perspective view taken in the same region as FIGURE 8 but omitting the position sensing means to facilitate illustration of the divider delivery blade.

The carton divider inserting apparatus includes a carton conveyor 1 bordered on each side by a conveyor chain 2 connected by cross or flight bars 3. Suitable adjustable side guides 4 are provided to accommodate cartons 5 of various widths. The cartons are arranged on the carton conveyor with both their upper flaps 6 and lower flaps 7 extending outwardly as represented in FIGURE 3.

A transversely disposed container conveyor 8 terminates under the carton conveyor 1. The container conveyor is adapted to receive a plurality of containers 9. In the construction illustrated, the containers are bottles. At the terminal end of the container conveyor 8 and centered under the carton conveyor 1 is a container lifting ram 10 dimensioned to lift the number of containers which are to be received in a carton 5. The ram when in its position, forms a continuation of the carton conveyor 1.

Positioned over the carton conveyor 1 is a first divider inserting mechanism A, and a second divider inserting mechanism B spaced longitudinally from each other. The first divider inserting mechanism A is adapted to position divider strips 11 arranged longitudinally with respect to the cartons and the carton conveyor and to accomplish this purpose extends laterally from the conveyor. The second divider inserting mechanism B is arranged to insert transverse divider strips 12 and to accomplish this purpose is arranged longitudinally with respect to the container conveyor as shown best in FIGURE 1. Except for differences in dimension to accommodate divider strips of different sizes, the two inserting mechanisms are identical. Thus while divider inserting mechanism B will be described, the description applies also to the divider mechanism A.

The divider inserting mechanism includes a pair of forward vertical posts 13 and a pair of rearward vertical posts 14 suitably secured to support framework 15 located below the level of the carton conveyor. The vertical posts are connected by upper and lower longitudinal bars 16 and 17 and transverse bars 18. Supported immediately above the lower longitudinal bars 17 is a pair of track rails 19 at least one of which is in the form of an inverted V in cross section. Mounted upon the rails 19 is a carriage 20 including side bars 21 connected by a front cross bar 22 and a rearward cross bar 23. The side bars 21 are provided with rollers 24 which engage the rails 19 in such a manner as to be guided thereby for movement longitudinally with respect to the frame structure comprising the posts 13 and 14 and bars 16, 17, and 18.

Extending between and secured to the front and rearward cross bars 22 and 23 of the carriage is a pair of fixed side plates 25. Secured to each fixed side plate is a pair of collars 26 which slideably receive positioning bars 27. Each pair of positioning bars is secured to an adjustable side plate 28. The side plates 28 are laterally moveable with respect to the carton so as to receive divider strips 11 or 12 therebetween. The collars 26 are provided with set screws 29 so as to lock the side plates 28 in their adjusted positions.

Secured to the front cross bar 22 of the carriage and reinforced by vertical member 30 is a front or stop plate 31. Overlying the stop plate 31 is an inserting blade 32 mounted between guides 33 for vertical movement. The inserting blade is moved by a ram 34 mounted at the upper end of the front plate 31.

Extending between the fixed side plates 25 of the carriage is a bottom plate 35 which defines with the front plate 31, a slit 36 of sufficient width to pass a single divider strip.

The bottom plate 35 and the adjustable side plates 28 are adapted to support and guide a stack of divider strips which is backed by a moveable back plate 37 operated by a ram 38 secured to the rear portion of the carriage. The ram maintains a predetermined pressure on the stack of divider strips.

Supported from the rearward transverse bar 18 of the frame structure is a carriage positioning ram 39.

Suitably secured to one side of the carriage is a laterally extending indexing plate 40 having a series of slots 41. Supported from the frame structure is a photocell unit 42 and a light source 43, as shown best in FIGURES 4, 6, and 8. The photocell and light source are so positioned that the light beam from the light source is interrupted by the indexing plate except when the slots 41 move between the light source and photocell.

Reference is now directed to the diagrammatical view 13. The feed ram 38 is operated by pneumatic pressure. The opposite ends of the ram cylinder are connected to operating lines 44 and 45 controlled by a manual valve 46 connected with a supply line 47 having a pressure regulator 48 therein so that the force applied against a stack of divider strips may be preset.

The opposite ends of the inserting ram 34 are connected by operating lines 49 and 50 to a control valve 51 which in turn is connected to a supply line 52. The control valve is operated by a solenoid which includes a thrust coil 53 for driving the inserting blade downward and a retracting coil 54 for raising the inserting blade. Limit switches 55 and 56 are suitably mounted on the carriage and located so as to be engaged by the inserting blade when the blade is in its upper and its lower positions respectively.

The carriage positioning ram 39 is preferably hydraulically operated and is connected by operating lines 57 and 58 to oil reservoirs 59 and 60. The oil reservoirs are connected by air lines 61 and 62 to a control valve which in turn is connected to a supply line 64.

The control valve 63 is operated by a solenoid which includes a thrust coil 65 and a retracting coil 66. Interposed in the operating line 58 is a locking valve 67 having an operating coil 68. Suitably located on the frame structure which includes the posts 13 and 14 are limit switches 69 and 70 operable when the carriage reaches its forward and its rearward positions respectively.

Also mounted on the frame structure is a carton positioning switch 71.

The photocell 42 is connected to the operating coil 72 of a two position relay 73. In addition there is provided a double pull relay switch 74 having an operating coil 75.

Operation of the divider inserting mechanism is as follows:

Cartons 5 are placed in front of the flight bars 3 of the carton conveyor. Both the bottom and top flaps 6 and 7 of each carton is folded outward as shown in FIGURE 3 so that both the top and the bottom of each carton is open. As each carton reaches a position over the container lifting ram 10 the appropriate number of bottles or other containers 9 is thrust upward into the carton. The carton then moves forward until it engages the carton positioning switch 71. It should be noted that only one such switch is needed and may be associated with either the divider inserting mechanism A or B or may be associated with the station occupied by the container lifting ram 10. The positioning switch 71 stops the carton conveyor 1 when three cartons are properly positioned for the container lifting ram 10 and the divider inserting mechanisms A and B.

Each inserting mechanism starts its operation with its carriage in one extreme position. After a carton has been positioned under inserting mechanism A, for example, the carriage advances until the first slot 41 is in registry with the photocell, whereupon the inserting blade ram 34 is operated, causing the inserting blade to push a divider between rows of the container A. On retraction of the ram 34 the carriage ram is activated to move to its next position for delivery of a second divider strip. In the construction illustrated, the cartons are shown as receiving twelve containers so that only two divider strips 11 are inserted, however the inserting mechanisms may be adjusted to accommodate a different number of bottles or containers. The inserting position of the carriage is accurately determined by reason of the fact that the photocell unit 42 causes the valve 67 in the operating ram 58 to close. Inasmuch as this portion of the system contains an essentially incompressible fluid closure of the valve 67 stops movement of the carriage immediately.

During the period of operation of the inserting mechanism A the inserting mechanism B is also in operation. Inasmuch as the inserting mechanism B handles the greater number of dividers, its carriage on closure of its limit switch 70 may be employed to restart the carton conveyor 1.

It will be noted that the divider inserting mechanisms are particularly suited for inserting dividers between bottles, especially upright bottles, due to the sloping surfaces thereof which guide or deflect the dividers therebetween. It will also be noted that the dividers are slotted in a conventional manner to permit cross positioning of the dividers.

It will be observed that, by reason of the fact both ends of the cartons are open, either the upper or lower side of the carton may be closed and sealed, depending on whether for purposes of filling the bottles later it is desired to have them mouth end up or inverted.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:
1. A divider inserting mechanism for cartons, comprising:
 (a) a conveyor for moving open cartons past a first and a second station;
 (b) means for stopping said conveyor with a carton in registry with each station;
 (c) a first and a second divider feeding mechanism positioned over said conveyor at said stations;
 (d) each divider feeding mechanism including means for storing a multiplicity of carton dividers, and means for feeding said dividers into said cartons in predetermined spaced relation;
 (e) one of said divider feeding mechanisms positioned to feed its dividers in planes parallel to the direction of movement of said conveyor;
 (f) the other of said divider feeding mechanisms positioned to feed its dividers at right angles thereto;
 (g) and means for starting said conveyor upon completion of placement of said dividers in said cartons.
2. A divider inserting apparatus for container filled, upwardly opened cartons comprising:
 (a) a conveyor for moving said cartons and the containers therein past a first and a second station;
 (b) means for stopping said conveyor with a carton in registry with each station;
 (c) a first and a second divider feeding mechanism positioned over said conveyor at said stations;
 (d) each divider feeding mechanism including means for storing a multiplicity of carton dividers, and means for feeding said dividers into said cartons between rows of said containers therein;
 (e) one of said divider feeding mechanisms positioned to feed its dividers in planes parallel to the direction of movement of said conveyor;
 (f) the other of said divider feeding mechanisms positioned to feed its dividers at right angles thereto;
 (g) and means for starting said conveyor upon completion of placement of said dividers in said cartons.
3. A divider inserting apparatus for container filled, upwardly opened cartons comprising:
 (a) a conveyor for moving said cartons and the containers therein past a first and a second station;

(b) a first and a second divider feeding mechanism positioned over said conveyor at said stations;

(c) each divider feeding mechanism including a carriage having means for storing a multiplicity of carton dividers, a template having indexing means corresponding to the spacing between said containers, means for advancing said carriage to a series of locations in accordance with the spacing of said indexing means, and means for inserting a divider into said carton as said carriage advances to each of said locations;

(d) one of said divider feeding mechanisms positioned to feed its dividers in planes parallel to the direction of movement of said conveyor;

(e) the other of said divider feeding mechanisms positioned to feed its dividers at right angles thereto.

4. The combination with a conveyor for moving a series of container filled open cartons of a divider inserting mechanisms, comprising:

(a) a carriage including means for storing a multiplicity of carton dividers;

(b) means for positioning said dividers over said cartons;

(c) a template having indexing means corresponding in spacing to the containers in said carton;

(d) means for advancing said carriage in accordance with said indexing means to position dividers in planes passing between said containers;

(e) and means for inserting said dividers between said containers.

5. A carton loading means, comprising:

(a) a conveyor arranged to carry a series of cartons with at least their upper sets of flaps extending outwardly from said cartons, whereby at least the upper end of each carton is open;

(b) means for inserting into each carton a load of containers disposed in rows and defining right angularly related sets of vertical planes therebetween extending longitudinally and transversely with respect to said carton;

(c) a first and a second divider feeding mechanism disposed in spaced relation over said conveyor corresponding to the spacing of the cartons thereon;

(d) means for stopping said conveyor with cartons in registry with the respective divider feeding mechanism; each mechanism including means for storing a multiplicity of carton dividers in longitudinal and transverse relation to said cartons, means for sequentially positioning dividers in registry with a set of said planes, and means for moving said dividers in said set of planes thereby to insert said dividers between said containers;

(f) and means operated by one of said feeding mechanisms for restarting said conveyor upon placement of said dividers in said cartons.

6. A carton loading means, comprising:

(a) a conveyor arranged to carry a series of cartons with their upper and lower flaps in an open condition whereby both ends are open; and including a supporting surface underlying said container;

(b) means interposed in said surface for upwardly inserting a load of containers into each carton, said containers being disposed in rows and columns defining therebetween sets of right angularly related planes;

(c) a first and a second divider feeding mechanism;

(d) each mechanism including means for storing a multiplicity of carton dividers in longitudinal and transverse relation to said carton, means for sequentially positioning dividers in registry with a set of said planes, and means for moving said dividers in said set of planes thereby to insert said dividers between said containers.

7. A carton loading means, comprising:

(a) a conveyor arranged to carry a series of cartons with at least their upper sets of flaps extending outwardly from said cartons, whereby at least the upper end of each carton is open;

(b) means for inserting into each carton a load of containers disposed in rows and defining right angularly related sets of vertical planes therebetween extending longitudinally and transversely with respect to said carton;

(c) a first and a second divider feeding mechanism disposed in spaced relation over said conveyor corresponding to the spacing of the cartons thereon;

(d) means for stopping said conveyor with cartons in registry with the respective divider feeding mechanism; each mechanism including a magazine for receiving a horizontally extending stack of carton dividers, and defining a slot at one end for discharge of dividers in sequence therethrough, means for sequentially disposing said slot in registry with the plane of one of said set of planes, and means for feeding said dividers through said slot for insertion between said containers;

(f) and means operated by one of said feeding mechanisms for restarting said conveyor upon placement of said dividers in said cartons.

8. A carton loading means, comprising:

(a) a conveyor arranged to carry a series of cartons with at least their upper sets of flaps extending outwardly from said cartons, whereby at least the upper end of each carton is open;

(b) means for inserting into each carton a load of containers disposed in rows and defining right angularly related sets of vertical planes therebetween extending longitudinally and transversely with respect to said carton;

(c) a first and a second divider feeding mechanism;

(d) each mechanism including a magazine for receiving a horizontally extending stack of carton dividers and defining a slot at one end for discharge of dividers in sequence through said slot, a template having indexing means thereon spaced in correspondence with the spacing of the planes in a set of said planes, means sensing the positions of said indexing means for sequentially disposing said slot in registry with said planes, and means for feeding said dividers through said slot thereby to insert said dividers between said containers.

References Cited

UNITED STATES PATENTS 2,478,794  8/1949  Vail _____ 93—37
2,615,289  10/1952  Hicken _____ 53—157 XR WILLIAM W. DYER, Jr., *Examiner.*

R. J. ALVEY, *Assistant Examiner.*